US012811511B2

(12) United States Patent
Akahane

(10) Patent No.: US 12,811,511 B2
(45) Date of Patent: Nov. 24, 2026

(54) CIRCUIT APPARATUS AND POWER CONVERSION CIRCUIT

(71) Applicant: FUJI ELECTRIC CO., LTD., Kanagawa (JP)

(72) Inventor: Masashi Akahane, Matsumoto-city (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 219 days.

(21) Appl. No.: 18/674,928

(22) Filed: May 27, 2024

(65) Prior Publication Data

US 2025/0023485 A1 Jan. 16, 2025

(30) Foreign Application Priority Data

Jul. 14, 2023 (JP) ................................ 2023-116206

(51) Int. Cl.
*H02M 7/217* (2006.01)
*H02M 1/00* (2006.01)

(52) U.S. Cl.
CPC ......... *H02M 7/217* (2013.01); *H02M 1/0067* (2021.05)

(58) Field of Classification Search
CPC ............................ H02M 7/217; H02M 1/0067
USPC ............................................................ 363/70
See application file for complete search history.

(56) References Cited

U.S. PATENT DOCUMENTS

| | | | | |
|---|---|---|---|---|
| 6,420,962 | B1 * | 7/2002 | Matsumoto | H04L 7/033 340/146.2 |
| 9,653,994 | B2 * | 5/2017 | Taguchi | H02M 3/158 |
| 2005/0168511 | A1 * | 8/2005 | Hu | B41J 29/393 347/19 |
| 2006/0193091 | A1 * | 8/2006 | Joukou | H03K 17/0828 361/23 |
| 2011/0032001 | A1 * | 2/2011 | Hasegawa | H02M 7/5387 327/1 |
| 2012/0050354 | A1 * | 3/2012 | Taguchi | H02M 1/36 327/108 |
| 2015/0023076 | A1 | 1/2015 | Nakamori | |
| 2020/0194994 | A1 | 6/2020 | Goto | |

FOREIGN PATENT DOCUMENTS

| | | | |
|---|---|---|---|
| JP | 2009258016 | A | 11/2009 |
| JP | 2011172336 | A | 9/2011 |
| JP | 2014093903 | A | 5/2014 |
| JP | 2020096436 | A | 6/2020 |

* cited by examiner

*Primary Examiner* — Yemane Mehari

(57) ABSTRACT

Provided is a circuit apparatus including a power conversion circuit, and a control circuit which controls the power conversion circuit, in which the power conversion circuit includes a control terminal to which a control signal from the control circuit is input, an output terminal from which an output signal is output to the control circuit, and a data identification unit which identifies an input data signal input to the output terminal. A first superimposed signal in which the output signal and the input data signal are superimposed on each other may be input to the data identification unit, and the data identification unit may identify the input data signal based on the first superimposed signal and the output signal.

22 Claims, 6 Drawing Sheets

10

CIRCUIT APPARATUS AND POWER CONVERSION CIRCUIT

The contents of the following patent applications are incorporated herein by reference:

NO. 2023-116206 filed in JP on Jul. 14, 2023

BACKGROUND

1. Technical Field

The present invention relates to a circuit apparatus and a power conversion circuit.

2. Related Art

Up to now, a circuit such as a power conversion circuit and a control circuit which controls the circuit have been proposed (see Patent documents 1 to 4, for example).

Patent document 1: Japanese Patent Application Publication No. 2014-93903

Patent document 2: Japanese Patent Application Publication No. 2009-258016

Patent document 3: Japanese Patent Application Publication No. 2011-172336

Patent document 4: Japanese Patent Application Publication No. 2020-96436

DESCRIPTION OF EXEMPLARY EMBODIMENTS

Figure 1:
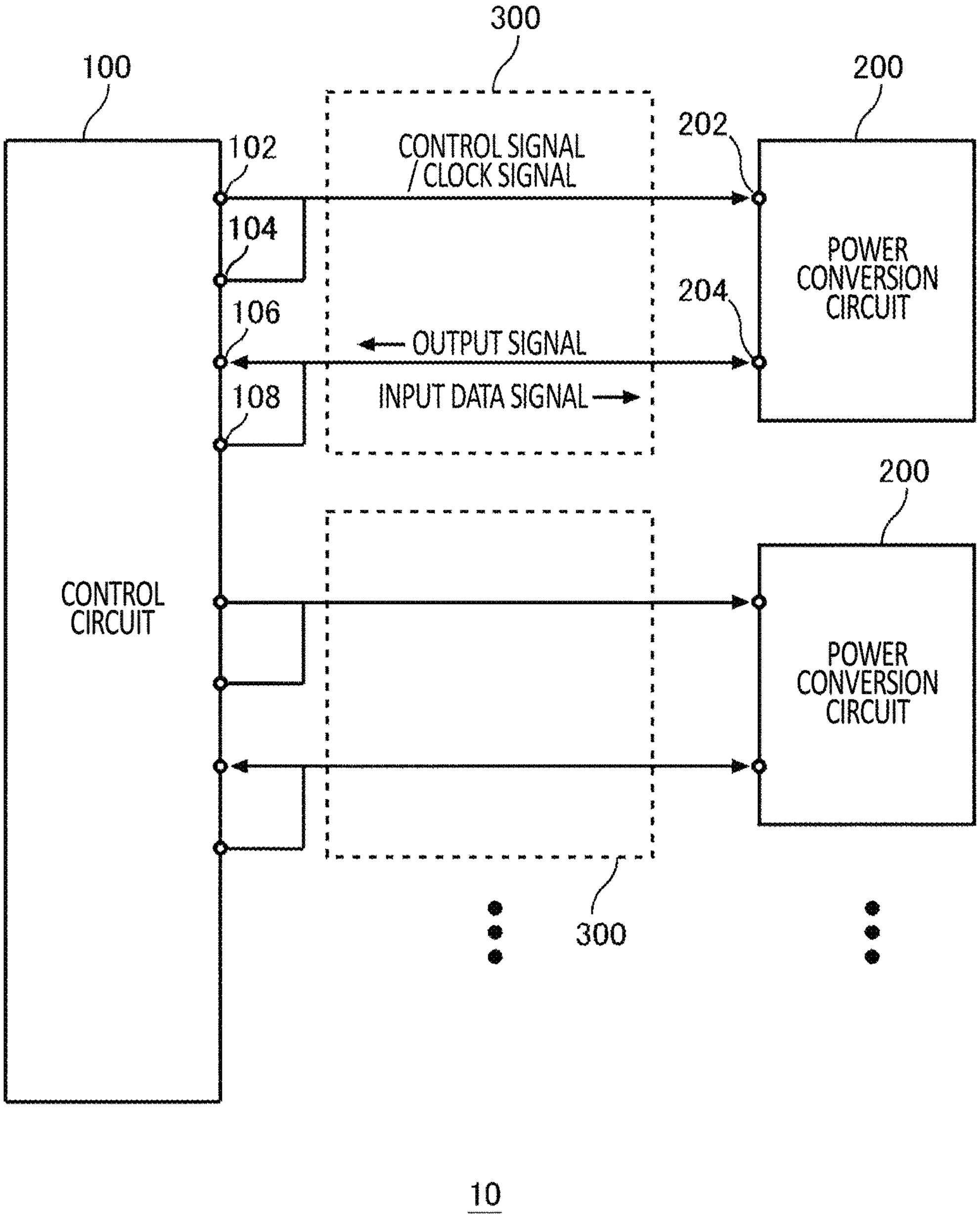
FIG. 1 illustrates an example of a circuit apparatus 10 according to an embodiment of the present invention.

Hereinafter, the present invention will be described by way of embodiments of the invention. However, the following embodiments are not for limiting the invention according to the claims. In addition, not all combinations of features described in the embodiment are essential to the solution of the invention. Note that in the present specification and the drawings, elements having substantially the same functions and configurations are denoted by the same reference numerals, and redundant descriptions for them are omitted. Elements not directly related to the present invention are also omitted from the drawings. Furthermore, in one drawing, elements having the same functions and configurations are denoted by a representative reference numeral, and other reference numerals for the elements may be omitted.

In the present specification, a case where a term such as "same" or "equal" is mentioned may include a case where an error due to a variation in manufacturing or the like is included. The error is, for example, within 10%.

FIG. 1 illustrates an example of a circuit apparatus 10 according to an embodiment of the present invention. The circuit apparatus 10 includes one or a plurality of power conversion circuits 200 and a control circuit 100. The power conversion circuit 200 may output electrical power to another circuit of a target apparatus in which the circuit apparatus 10 is provided. As an example, the control circuit 100 is a computer provided in the target apparatus. The control circuit 100 may control a circuit other than the power conversion circuit 200 of the target apparatus. The target apparatus is a vehicle, an industrial robot, or the like as an example, but is not limited to this. The circuit apparatus 10 may further include a transmission apparatus 300 which transmits a signal between the power conversion circuit 200 and the control circuit 100. The transmission apparatus 300 may be provided for each of the power conversion circuits 200.

The power conversion circuit 200 converts input electrical power into predetermined output electrical power. As an example, the power conversion circuit 200 is an ACDC converter which converts DC electrical power into AC electrical power, but a mode of the power conversion circuit 200 is not limited to this. The power conversion circuit 200 may include a power semiconductor such as an IGBT. The power conversion circuit 200 may include an inverter. The power conversion circuit 200 may supply electrical power to an electric motor such as a motor.

The control circuit 100 controls the power conversion circuit 200. The control circuit 100 may control on and off of an operation of the power conversion circuit 200, and may control an amplitude, a frequency, or the like of electrical power that is output by the power conversion circuit 200. The control circuit 100 of the present example transmits a control signal to each of the power conversion circuits 200. The control signal may control switching of a transistor inside the power conversion circuit 200.

The power conversion circuit 200 has a control terminal 202 and an output terminal 204. The control signal from the control circuit 100 is input to the control terminal 202 via the transmission apparatus 300. An output signal is output from the output terminal 204 to the control circuit 100. The output signal is transmitted by the transmission apparatus 300.

The output signal is, for example, a signal indicating a state of the power conversion circuit 200. The output signal may include an alarm signal indicating whether the power conversion circuit 200 is put into any preset state. The state may be an abnormal state such as an excess current state in which a current at a predetermined value or above flows into a predetermined part of the power conversion circuit 200, an excess voltage state in which a voltage at a predetermined value or above is applied to a predetermined part of the power conversion circuit 200, or an excess heat state in which a temperature of a predetermined part of the power conversion circuit 200 becomes a predetermined value or above. The power conversion circuit 200 may change a pulse width of the alarm signal according to a type of the abnormal state. As a result, the control circuit 100 can detect a type of an abnormality that has occurred in the power conversion circuit 200.

The output signal may include an output data signal generated by the power conversion circuit 200. The output signal may include one or both of the alarm signal and the output data signal. The output data signal may be a signal indicating an internal state of the power conversion circuit 200 by a numerical value. The output data signal may indicate a numerical value of a parameter such as a temperature, a voltage, or a current at a predetermined part of the power conversion circuit 200. The output data signal may be data generated according to a request from the control circuit 100. Each signal in the present specification may be a signal indicating information of one or more bits by an arrangement pattern of pulses on a time axis.

The control circuit 100 of the present example has a control output terminal 102, a clock output terminal 104, an input terminal 106, and a data output terminal 108. The control output terminal 102 outputs a control signal. The clock output terminal 104 outputs a clock signal. The output signal from the power conversion circuit 200 is input to the input terminal 106. An input data signal is output from the data output terminal 108.

The input data signal is a signal including data to be input to the power conversion circuit 200. The input data signal may include optional data. The input data signal may include data for specifying a destination of the output signal of the power conversion circuit 200, may include data to be recorded in a memory inside the power conversion circuit 200, or may include data for controlling the operation of the power conversion circuit 200.

The clock signal is used for communication between the control circuit 100 and the power conversion circuit 200. For example, the power conversion circuit 200 may sample a data value of the input data signal according to a period of the clock signal. The clock signal may be used as an operation clock of an internal circuit of the power conversion circuit 200.

The period of the clock signal may be smaller than a pulse width of the alarm signal. The period of the clock signal may be a half or less of the pulse width of the alarm signal. The power conversion circuit 200 may generate the alarm signal having a pulse width that is an integer multiple of the period of the clock signal. The power conversion circuit 200 may generate the output data signal with a same period as the clock signal. When a pulse width of the output signal becomes a certain value or above, the control circuit 100 may determine that the alarm signal is output. When the alarm signal and the output data signal are to be simultaneously output, the power conversion circuit 200 may output any of the signals by priority. The power conversion circuit 200 may output the alarm signal by priority.

The transmission apparatus 300 of the present example inputs the input data signal from the control circuit 100 to the output terminal 204 of the power conversion circuit 200. The power conversion circuit 200 has a data identification unit which identifies the input data signal that is input to the output terminal 204. Since the output terminal 204 not only functions as a terminal for output of the output signal but also functions as a terminal for input of the input data signal, a number of terminals of the power conversion circuit 200 can be reduced.

The transmission apparatus 300 may input both the control signal and the clock signal to the control terminal 202. The power conversion circuit 200 may have a clock identification unit which separates the clock signal input to the control terminal 202 from the control signal. Since the control terminal 202 not only functions as a terminal for input of the control signal but also functions as a terminal for input of the clock signal, the number of terminals of the power conversion circuit 200 can be further reduced.

When a plurality of power conversion circuits 200 are connected to a common terminal of the control circuit 100, an identification code may be assigned to each of the power conversion circuits 200. At least one of the input data signal or the output data signal may include the identification code. When communication is to be started with any of the power conversion circuits 200, the control circuit 100 may transmit the input data signal including the identification code of the power conversion circuit 200. When the input data signal including the identification code corresponding to itself is received, each of the power conversion circuits 200 may operate according to the input data signal. The control circuit 100 may determine, based on identification information included in an output data signal, the output data signal is a signal from which of the power conversion circuits 200.

The control circuit 100 may inform the power conversion circuit 200 of start of the communication by transmitting the clock signal. In another example, the control circuit 100 may inform the power conversion circuit 200 of start of the communication by a method similar to 12C communication. The control circuit 100 may inform the power conversion circuit 200 of start of the communication by using the input data signal.

Figure 2:
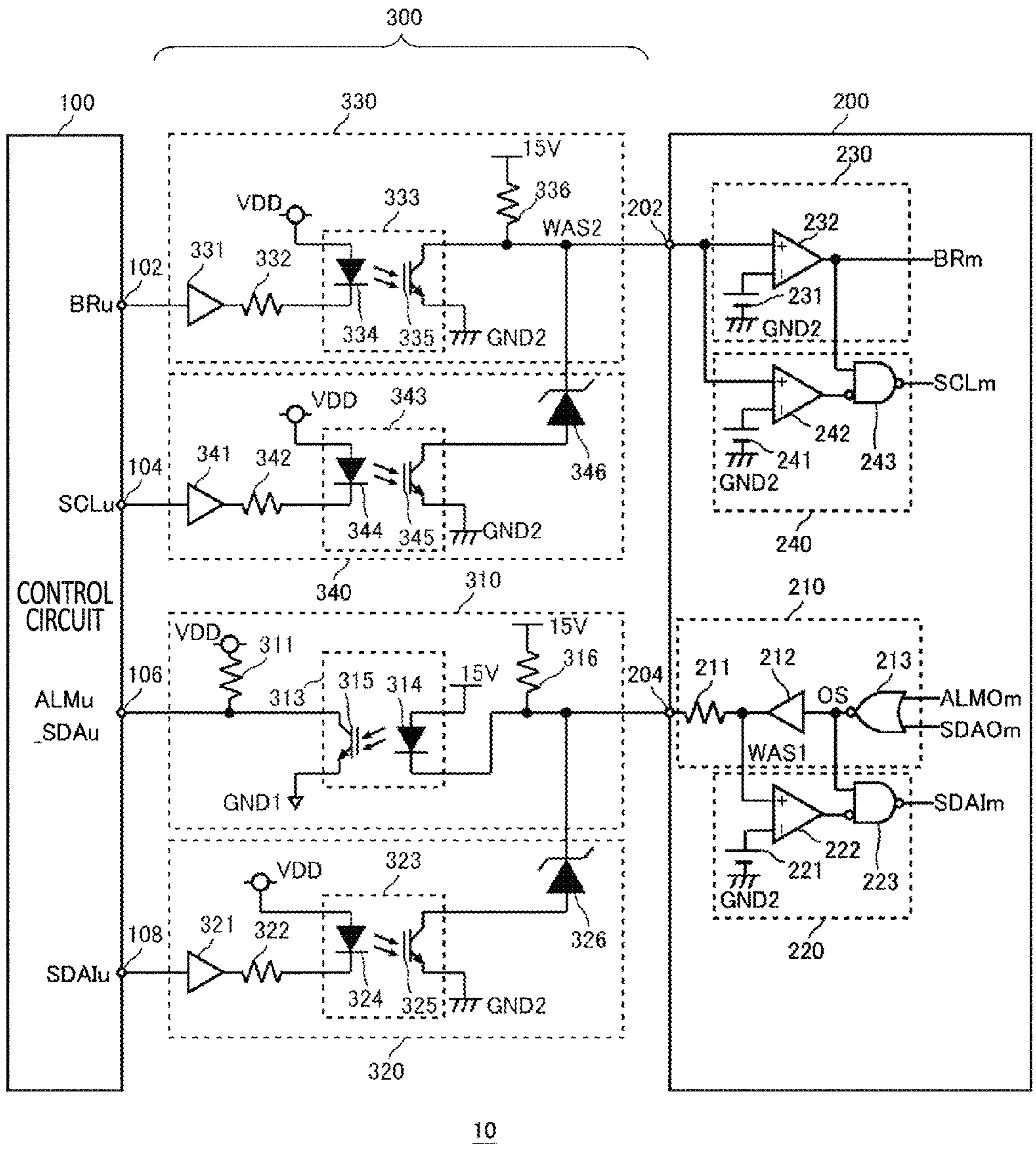
FIG. 2 illustrates a specific circuit example of the circuit apparatus 10.

FIG. 2 illustrates a specific circuit example of the circuit apparatus 10. First, a configuration related to the output signal and the input data signal which are transmitted among the output terminal 204, the input terminal 106, and the data output terminal 108 will be described. Then, a configuration related to the control signal and the clock signal which are transmitted among the control terminal 202, the control output terminal 102, and the clock output terminal 104 will be described.

Configuration Related to the Output Signal and the Input Data Signal

The power conversion circuit 200 of the present example includes a signal output unit 210 and a data identification unit 220 which are connected to the output terminal 204. The signal output unit 210 outputs an output signal OS transmitted from the power conversion circuit 200 to the control circuit 100. The output signal OS may include at least one of an alarm signal ALMOm or an output data signal SDAOm. The output signal OS of the present example is a logical OR signal of the alarm signal ALMOm and the output data signal SDAOm.

The signal output unit 210 of the present example has a negative OR circuit 213, a buffer circuit 212, and a resistor 211. The negative OR circuit 213 outputs the output signal OS indicating a negative OR of the alarm signal ALMOm and the output data signal SDAOm. For example, the alarm signal ALMOm and the output data signal SDAOm may be signals indicating information of one or more bits by an arrangement pattern of pulses on a time axis. Each signal in the present specification may be a signal in which a voltage at a H level indicates a logical value 1, and a voltage at an L level indicates a logical value 0. The negative OR circuit 213 of the present example may output the voltage at the L level when at least one of the alarm signal ALMOm or the output data signal SDAOm indicates the voltage at the H level, and may output the voltage at the H level when both the alarm signal ALMOm and the output data signal SDAOm indicate the voltage at the L level.

The buffer circuit 212 outputs a signal according to the output signal OS. An output terminal of the buffer circuit 212 is connected to the output terminal 204 via the resistor 211. An input data signal SDAlu from the control circuit 100 is applied to the output terminal 204 of the present example. Thus, a first superimposed signal WAS1 in which the output signal OS and the input data signal SDAlu are superimposed on each other is applied to the output terminal 204. In the first superimposed signal WAS1 of the present example, a pulse of the output signal OS and a pulse of the input data signal SDAlu are mixed.

The data identification unit 220 extracts an input data signal SDAlm from the first superimposed signal WAS1. In the present specification, an end of a reference sign for each signal to be transmitted between the control circuit 100 and the power conversion circuit 200 may be added with a sign u or m. The signal added with the sign u is a signal that is transmitted by the control circuit 100 or received by the control circuit 100. The signal added with the sign m is a signal that is transmitted by the power conversion circuit 200 or received by the power conversion circuit 200.

The data identification unit 220 of the present example identifies the input data signal SDAlm based on the first superimposed signal WAS1 and the output signal OS. For example, the input data signal SDAlm can be identified by extracting a pulse string that is not the pulse of the output signal OS among pulses included in the first superimposed signal WAS1. The data identification unit 220 of the present example has a reference voltage generation unit 221, a comparator 222, and a logic circuit 223.

The reference voltage generation unit 221 generates a first reference voltage for extracting each pulse of the first superimposed signal WAS1. The first reference voltage of the present example is higher than the voltage at the L level and lower than the voltage at the H level of all the pulses included in the first superimposed signal WAS1.

The comparator 222 outputs a signal which indicates a voltage at the L level when a voltage of the first superimposed signal WAS1 is equal to or lower than the first reference voltage or indicates a voltage at the H level when the voltage of the first superimposed signal WAS1 is higher than the first reference voltage. The signal includes all the pulses (waveforms indicating the voltage at the L level) of the first superimposed signal WAS1.

The logic circuit 223 extracts the pulse other than the pulse of the output signal OS among the pulses included in the first superimposed signal WAS1 to generate the input data signal SDAlm. The logic circuit 223 of the present example outputs the input data signal SDAlm which turns to the L level when the output signal OS indicates the voltage at the H level and also an output of the comparator 222 indicates the voltage at the L level and turns to the H level during the other periods. That is, the input data signal SDAlm has the pulse during a period in which the output signal OS does not have the pulse and also the first superimposed signal WAS1 has the pulse. The logic circuit 223 may output a signal obtained by inverting a logical AND of an inverted signal of the output of the comparator 222 and the output signal OS. The logic circuit 223 may have other structures. For example, the logic circuit 223 may include a circuit which outputs an exclusive OR of the output signal OS and the first superimposed signal WAS1.

In accordance with such a configuration, the input data signal SDAlm input to the output terminal 204 can be extracted from the first superimposed signal WAS1. Since a terminal to which the input data signal SDAlm is input does not necessarily need to be newly provided, the number of terminals of the power conversion circuit 200 can be suppressed.

The transmission apparatus 300 of the present example has a first transmission unit 310 and a second transmission unit 320 which are provided between the output terminal 204 and the control circuit 100. The first transmission unit 310 outputs a signal at the output terminal 204 to the input terminal 106 of the control circuit 100. The second transmission unit 320 superimposes the input data signal SDAlu from the data output terminal 108 of the control circuit 100 on the signal at the output terminal 204. As a result, the first superimposed signal WAS1 is applied to the output terminal 204.

The first transmission unit 310 of the present example has a resistor 311, a photocoupler 313, and a resistor 316. The photocoupler 313 includes a light emitting element 314 such as a light emitting diode, and a light receiving element 315 such as a phototransistor. By using the photocoupler 313, the signal can be transmitted while a transmission side and a reception side of the signal are electrically isolated from each other.

The light emitting element 314 emits light according to the pulse of the first superimposed signal WAS1. A predetermined high voltage (for example, 15 V) is applied to an anode of the light emitting element 314 of the present example, and a predetermined high voltage (for example, 15 V) is also applied to a cathode of the light emitting element via the resistor 316. In addition, the cathode of the light emitting element 314 is connected to the output terminal 204. As a result, the light emitting element 314 emits light when the first superimposed signal WAS1 turns to the voltage at the L level.

The light receiving element 315 converts the light from the light emitting element 314 into an electrical signal. The light receiving element 315 may generate an electrical signal with an amplitude different from the first superimposed signal WAS1, or may generate an electrical signal with a same amplitude. A predetermined high voltage VDD is applied to a collector of the light receiving element 315 of the present example via the resistor 311, and a predetermined reference potential GND1 is applied to an emitter of the light receiving element 315. In addition, the collector of the light receiving element 315 is connected to the input terminal 106. As a result, an input signal ALMu_SDAu having a same pulse pattern as the first superimposed signal WAS1 and having an amplitude according to the high voltage VDD is applied to the input terminal 106. The high voltage VDD may be different from the high voltage (for example, 15 V) applied to the resistor 316. The high voltage VDD of the present example is 5 V. The reference potential GND1 is, for example, 0 V.

A pulse pattern of the input signal ALMu_SDAu is the same as the first superimposed signal WAS1. Thus, the input signal ALMu_SDAu includes pulses of both signals of the output signal OS and the input data signal SDAlu. The control circuit 100 may extract a pulse pattern of the output signal OS from the input signal ALMu_SDAu based on the pulse pattern of the input data signal SDAlu generated by itself. The control circuit 100 may extract, as the pulse pattern of the output signal OS, a pulse during a period in which the input data signal SDAlu does not have a pulse among the pulses of the input signal ALMu_SDAu. This processing may be performed by logical operation processing by a computer, or may be performed by a circuit similar to the data identification unit 220.

The second transmission unit 320 of the present example has a buffer circuit 321, a resistor 322, a photocoupler 323, and a Zener diode 326. The photocoupler 323 includes a light emitting element 324 such as a light emitting diode, and a light receiving element 325 such as a phototransistor.

The light emitting element 324 emits light according to a pulse of the input data signal SDAlu. The high voltage VDD is applied to an anode of the light emitting element 324 of the present example. A cathode of the light emitting element 324 is connected to an output of the buffer circuit 321 via the resistor 322. An input of the buffer circuit 321 is connected to the data output terminal 108. The buffer circuit 321 applies a voltage according to the input data signal SDAlu to the cathode of the light emitting element 324. As a result, the light emitting element 324 emits light according to a pulse (voltage at the L level) in the input data signal SDAlu.

The light receiving element 325 converts the light from the light emitting element 324 into an electrical signal. A predetermined high voltage (for example, 15 V) is applied to a collector of the light receiving element 325 of the present example via the Zener diode 326 and the resistor 316, and a predetermined reference potential GND 2 is applied to an emitter of the light receiving element 325. The reference potential GND 2 is, for example, 0 V.

An anode of the Zener diode 326 is connected to the collector of the light receiving element 325, a high voltage (for example, 15 V) is applied to a cathode of the Zener diode 326 via the resistor 316. In addition, the cathode of the Zener diode 326 is connected to the output terminal 204. An amplitude of the input data signal SDAlu to be superimposed on the output terminal 204 is determined according to a breakdown voltage of the Zener diode 326. In the present example, the voltage at the L level of the input data signal SDAlu to be superimposed on the output terminal 204 becomes equal to the breakdown voltage of the Zener diode 326. The breakdown voltage of the Zener diode 326 may be smaller than the high voltage (for example, 15 V) applied to the resistor 316. As an example, the breakdown voltage of the Zener diode 326 is 5 V.

As described above, a signal with a same pulse pattern as the first superimposed signal WAS1 may be input to the input terminal 106 of the control circuit 100. The control circuit 100 may identify the output signal OS based on the first superimposed signal WAS1 and the input data signal SDAlu which have been received. The control circuit 100 may determine, as the pulse of the output signal OS, a pulse that does not match the pulse of the input data signal SDAlu among the pulses of the first superimposed signal WAS1. When it is determined that the pulse of the output signal OS exists in the first superimposed signal WAS1, the control circuit 100 may stop the output of the input data signal SDAlu. As a result, the pulse of the input data signal SDAlu and the pulse of the output signal OS are not superimposed on each other in the first superimposed signal WAS1, and the pulse of the output signal OS can be communicated by priority. When the pulse of the output signal OS is not received during a set period, the control circuit 100 may resume the output of the input data signal SDAlu.

In another example, a signal with a same pulse pattern as the output signal OS may be input to the input terminal 106 of the control circuit 100. In this case, the control circuit 100 can process, as the pulse pattern of the output signal OS, the pulse pattern of the signal that is input to the input terminal 106. The first transmission unit 310 transmits, to the control circuit 100, a signal (pulse in the present example) with a current flowing at a reference current value or above among the first superimposed signal WAS1 at the output terminal 204. The reference current value is a current value at a lower limit at which the light emitting element 314 can emit light.

The buffer circuit 212 and the resistor 211 of the present example cause a current at the reference current value or above to flow in the light emitting element 314 according to the pulse of the output signal OS. On the other hand, the second transmission unit 320 converts the input data signal SDAlu into a signal of a current with less than the reference current value to be superimposed on the signal at the output terminal 204. By adjusting the breakdown current of the Zener diode 326, the current which flows according to the pulse of the input data signal SDAlu can be adjusted. The second transmission unit 320 may have an element such as a resistor for adjusting the breakdown current of the Zener diode 326 in series to the Zener diode 326. As a result, it is possible to set a configuration where the light emitting element 314 emits light according to the pulse of the output signal OS, and the light emitting element 314 does not emit light according to the pulse of the input data signal SDAlu. Thus, the signal with the same pulse pattern as the output signal OS can be input to the input terminal 106 of the control circuit 100.

Configuration Related to the Control Signal and the Clock Signal

The power conversion circuit 200 of the present example includes a control identification unit 230 and a clock identification unit 240 which are connected to the control terminal 202. A second superimposed signal WAS2 in which a control signal BRu and a clock signal SCLu are superimposed on each other is input to the control terminal 202. The control identification unit 230 identifies the control signal BRu included in the second superimposed signal WAS2. The clock identification unit 240 identifies the clock signal SCLu included in the second superimposed signal WAS2.

The second superimposed signal WAS2 includes a pulse of the control signal BRu and a pulse of the clock signal SCLu. The pulse of the control signal BRu and the pulse of the clock signal SCLu which are included in the second superimposed signal WAS2 are mutually identifiable pulses. The pulse of the control signal BRu and the pulse of the clock signal SCLu in the present example have mutually different amplitudes.

The control identification unit 230 separates and identifies the control signal BRu included in the second superimposed signal WAS2 from the clock signal SCLu. The control identification unit 230 of the present example identifies the pulse of the control signal BRu based on the amplitude of each of the pulses included in the second superimposed signal WAS2. The control identification unit 230 of the present example has a reference voltage generation unit 231 and a comparator 232.

The reference voltage generation unit 231 generates a second reference voltage according to the amplitudes of the pulses of the control signal BRu and the clock signal SCLu. For example, when a voltage (voltage at the L level in the present example) of the pulse of the control signal BRu is lower than a voltage of the pulse of the clock signal SCLu, the second reference voltage is a voltage between the voltage of the pulse of the control signal BRu and the voltage of the pulse of the clock signal SCLu.

The comparator 232 outputs a control signal BRm which indicates a voltage at the L level when a voltage of the second superimposed signal WAS2 is equal to or lower than the second reference voltage and which indicates a voltage at the H level when the voltage of the second superimposed signal WAS2 is higher than the second reference voltage. In the present example, the voltage of the pulse of the control signal BRu is lower than the second reference voltage, and the voltage of the pulse of the clock signal SCLu is higher than the second reference voltage. Thus, by comparing the voltage of the second superimposed signal WAS2 with the second reference voltage, the control signal BRm from which the pulse of the control signal BRu included in the second superimposed signal WAS2 is extracted can be generated.

The clock identification unit 240 separates and identifies the clock signal SCLu included in the second superimposed signal WAS2 from the control signal BRu. The clock identification unit 240 of the present example identifies the pulse of the clock signal SCLu based on the amplitude of each of the pulses included in the second superimposed signal WAS2. The clock identification unit 240 of the present example has a reference voltage generation unit 241, a comparator 242, and a logic circuit 243.

The reference voltage generation unit 241 generates a third reference voltage according to the amplitudes of the pulses of the control signal BRu and the clock signal SCLu. The third reference voltage of the present example is higher than the voltage (voltage at the L level) of any of the pulses of the control signal BRu and the clock signal SCLu and is lower than the voltage at the H level.

The comparator 242 outputs a signal which indicates a voltage at the L level when the voltage of the second superimposed signal WAS2 is equal to or lower than the third reference voltage and which indicates a voltage at the H level when the voltage of the second superimposed signal WAS2 is higher than the third reference voltage. In the present example, the voltages of each of the pulses of the control signal BRu and the clock signal SCLu are lower than the third reference voltage. Thus, the signal output by the comparator 242 includes all the pulses of the second superimposed signal WAS2.

The logic circuit 243 extracts pulses other than the pulse of the control signal BRm among the pulses included in the second superimposed signal WAS2 to generate a clock signal SCLm. The logic circuit 243 of the present example outputs the clock signal SCLm which turns to the L level during a period in which the control signal BRm indicates the voltage at the H level and also the comparator 242 outputs the voltage at the L level and turns to the H level during the other periods. The logic circuit 243 may output a signal obtained by inverting a logical AND of an inverted signal of the output of the comparator 242 and the control signal BRm. As described in the logic circuit 223, the logic circuit 243 may have other structures.

In accordance with such a configuration, it is possible to separate and identify the control signal BRu and the clock signal SCLu which are input to the control terminal 202 from each other. Since a terminal to which the clock signal SCLu is input does not necessarily need to be newly provided, the number of terminals of the power conversion circuit 200 can be suppressed.

In the present example, a case has been described where the voltage of the pulse of the control signal BRu is lower than the voltage of the pulse of the clock signal SCLu. In another example, the voltage of the pulse of the control signal BRu may be higher than the voltage of the pulse of the clock signal SCLu. When the second superimposed signal WAS2 including such pulses is input to the control terminal 202 illustrated in FIG. 2, the output of the control identification unit 230 is equivalent to the clock signal SCLm, and the output of the clock identification unit 240 is equivalent to the control signal BRm.

The transmission apparatus 300 of the present example has a third transmission unit 330 and a fourth transmission unit 340 which are provided between the control terminal 202 and the control circuit 100. The third transmission unit 330 outputs the control signal BRu from the control output terminal 102 to the control terminal 202. The fourth transmission unit 340 superimposes the clock signal SCLu from the clock output terminal 104 on the signal at the control terminal 202. As a result, the second superimposed signal WAS2 is applied to the control terminal 202.

The third transmission unit 330 of the present example has a buffer circuit 331, a resistor 332, a photocoupler 333, and a resistor 336. The photocoupler 333 includes a light emitting element 334 such as a light emitting diode, and a light receiving element 335 such as a phototransistor.

The light emitting element 334 emits light according to the pulse of the control signal BRu. The high voltage VDD is applied to an anode of the light emitting element 334 of the present example. A cathode of the light emitting element 334 is connected to the output of the buffer circuit 331 via the resistor 332. The input of the buffer circuit 331 is connected to the control output terminal 102. The buffer circuit 331 applies a voltage according to the control signal BRu to the cathode of the light emitting element 334. As a result, the light emitting element 334 emits light according to the pulse (voltage at the L level) in the control signal BRu.

The light receiving element 335 converts light from the light emitting element 334 into an electrical signal. A predetermined high voltage (for example, 15 V) is applied to a collector of the light receiving element 335 of the present example via the resistor 336, and a predetermined reference potential GND2 is applied to an emitter of the light receiving element 335. As a result, the control signal BRu having the amplitude according to the high voltage (for example, 15 V) is applied to the control terminal 202.

The fourth transmission unit 340 of the present example has a buffer circuit 341, a resistor 342, a photocoupler 343, and a Zener diode 346. The photocoupler 343 includes a light emitting element 344 such as a light emitting diode, and a light receiving element 345 such as a phototransistor.

The light emitting element 344 emits light according to the pulse of the clock signal SCLu. The high voltage VDD is applied to an anode of the light emitting element 344 of the present example. A cathode of the light emitting element 344 is connected to an output of the buffer circuit 341 via the resistor 342. An input of the buffer circuit 341 is connected to the clock output terminal 104. The buffer circuit 341 applies a voltage according to the clock signal SCLu to the cathode of the light emitting element 344. As a result, the light emitting element 344 emits light according to a pulse (voltage at the L level) in the clock signal SCLu.

The light receiving element 345 converts the light from the light emitting element 344 into an electrical signal. A predetermined high voltage (for example, 15 V) is applied to a collector of the light receiving element 345 of the present example via the Zener diode 346 and the resistor 336, and the predetermined reference potential GND2 is applied to an emitter of the light receiving element 345.

An anode of the Zener diode 346 is connected to the collector of the light receiving element 345, and a high voltage (for example, 15 V) is applied to a cathode of the Zener diode 346 via the resistor 336. In addition, the cathode of the Zener diode 346 is connected to the control terminal 202. An amplitude of the clock signal SCLm to be superimposed on the control terminal 202 is determined according to a breakdown voltage of the Zener diode 346. The breakdown voltage of the Zener diode 346 may be smaller than the high voltage applied to the resistor 336. As an example, the breakdown voltage of the Zener diode 346 is 5 V.

As described above, the amplitudes of the pulse of the control signal BRu and the pulse of the clock signal SCLu which are included in the second superimposed signal WAS2 of the present example are different from each other. At least one of the third transmission unit 330 or the fourth transmission unit 340 may have an amplitude conversion unit which converts an amplitude of a signal. In the example of FIG. 2, the Zener diode 346 of the fourth transmission unit 340 functions as the amplitude conversion unit. In accordance with such a configuration, the pulse of the control signal BRu and the pulse of the clock signal SCLu which are included in the second superimposed signal WAS2 can be separated from each other.

Figure 3:
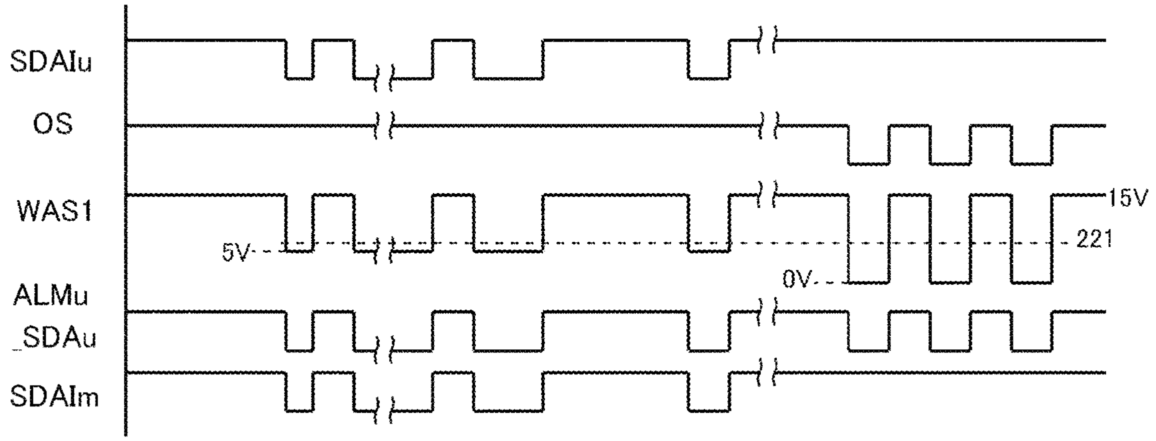
FIG. 3 is a timing chart for describing an operation related to an input data signal SDAlu and an output signal OS.

FIG. 3 is a timing chart for describing an operation related to the input data signal SDAlu and the output signal OS. As described in FIG. 2, the control circuit 100 outputs the input data signal SDAlu. The power conversion circuit 200 outputs the output signal OS.

As illustrated in FIG. 3, the first superimposed signal WAS1 at the output terminal 204 includes each of the pulses of the input data signal SDAlu and the output signal OS. The amplitudes of the pulse of the input data signal SDAlu and the pulse of the output signal OS which are included in the first superimposed signal WAS1 may be different from each other. In the present example, the pulse according to the input data signal SDAlu has an amplitude (15 V to 5 V) according to the breakdown voltage (for example, 5 V) of the Zener diode 326. In addition, the pulse according to the output signal OS has an amplitude (15 V to 0 V) according to the reference potential GND2 (0 V). In another example, the pulse of the input data signal SDAlu and the pulse of the output signal OS which are included in the first superimposed signal WAS1 may have a same amplitude.

The first transmission unit 310 transmits the first superimposed signal WAS1 to the input terminal 106. The first transmission unit 310 of the present example sets the amplitude of each of the pulses in the first superimposed signal WAS1 to be the same by the photocoupler 313 for transmission. The control circuit 100 of the present example receives the input signal ALMu_SDAu having a same pulse pattern as the first superimposed signal WAS1. As described above, the control circuit 100 can identify the output signal OS of the power conversion circuit 200 based on the input signal ALMu_SDAu and the input data signal SDAlu generated by itself.

The reference voltage generation unit 221 of the data identification unit 220 generates the first reference voltage from which all the pulses included in the first superimposed signal WAS1 can be extracted. The reference voltage generation unit 221 of the present example generates a voltage that is higher than 5 V and lower than 15 V. The comparator 222 compares the first reference voltage with the voltage of the first superimposed signal WAS1. A pulse pattern of a signal output by the comparator 222 is the same as the pulse pattern of the first superimposed signal WAS1. In the present example, the pulse pattern of the signal output by the comparator 222 is the same as the pulse pattern of the signal ALMu_SDAu, and is therefore omitted.

The logic circuit 223 generates the input data signal SDAlm based on the signal output by the comparator 222 and the output signal OS. As described above, the logic circuit 223 extracts the pulse that is not superimposed on the pulse of the output signal OS among the pulses included in the signal output by the comparator 222. As a result, it is possible to generate the input data signal SDAlm.

Figure 4:
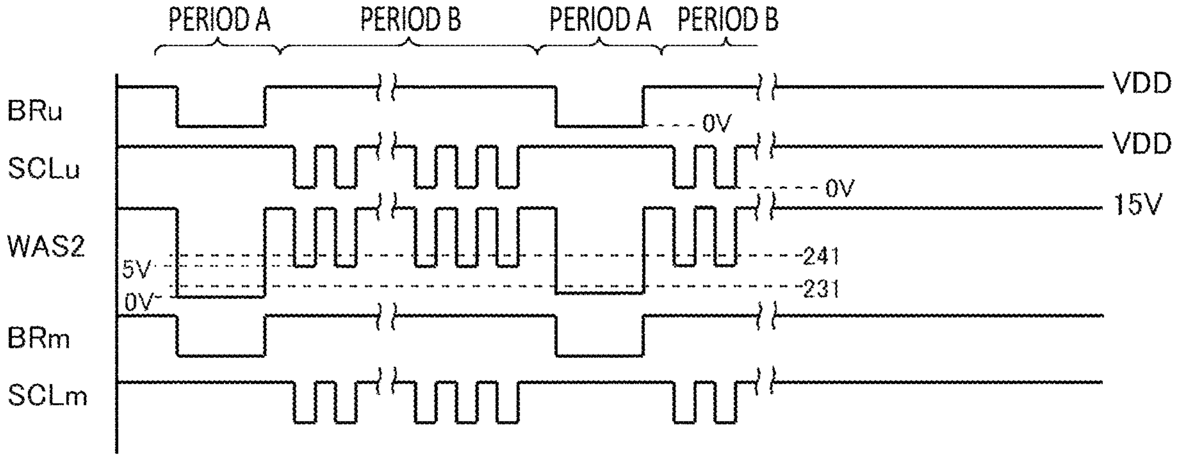
FIG. 4 is a timing chart for describing an operation related to a control signal and a clock signal.

FIG. 4 is a timing chart for describing an operation related to the control signal and the clock signal. As described in FIG. 2, the control circuit 100 outputs the control signal BRu and the clock signal SCLu. The control signal BRu and the clock signal SCLu which are output by the control circuit 100 are signals which have the high voltage VDD during a period in which those signals do not have a pulse, and have the reference potential GND1 (0 V) during a period in which those signals have a pulse.

As illustrated in FIG. 4, the second superimposed signal WAS2 at the control terminal 202 includes each of the pulses of the control signal BRu and the clock signal SCLu. The amplitudes of the pulse of the control signal BRu and the pulse of the clock signal SCLu which are included in the second superimposed signal WAS2 of the present example are different from each other. In the present example, the pulse according to the clock signal SCLu has an amplitude (15 V to 5 V) according to the breakdown voltage (for example, 5 V) of the Zener diode 346. In addition, the pulse according to the control signal BRu has an amplitude (15 V to 0 V) according to the reference potential GND2 (0 V).

The reference voltage generation unit 231 of the control identification unit 230 generates the second reference voltage with which only a pulse corresponding to the control signal BRu can be extracted among the pulses included in the second superimposed signal WAS2. The second reference voltage of the present example is larger than 0 V and smaller than 5 V.

The comparator 232 of the control identification unit 230 compares the voltage of the second superimposed signal WAS2 with the second reference voltage. A pulse pattern of the control signal BRm output by the comparator 232 becomes the same as a pulse pattern of the control signal of the control signal BRu.

The reference voltage generation unit 241 of the clock identification unit 240 generates the third reference voltage with which all the pulses included the second superimposed signal WAS2 can be extracted. The third reference voltage of the present example is higher than 5 V and lower than 15 V. The comparator 242 compares the third reference voltage with the voltage of the second superimposed signal WAS2. A pulse pattern of the signal output by the comparator 242 is the same as a pulse pattern of the second superimposed signal WAS2.

The logic circuit 243 generates the clock signal SCLm based on the signal output by the comparator 242 and the control signal BRm. As described above, the logic circuit 243 extracts the pulse that is not superimposed on the pulse of the control signal BRm among the pulses included in the signal output by the comparator 242. As a result, the clock signal SCLm can be generated.

The control circuit 100 of the present example arranges the pulse of the control signal BRu and the pulse of the clock signal SCLu in different periods. In FIG. 4, the pulse of the control signal BRu is arranged in a period A, and the pulse of the clock signal SCLu is arranged in a period B. In accordance with such an arrangement, the pulse of the control signal BRu and the pulse of the clock signal SCLu can be precisely identified.

Figure 5:
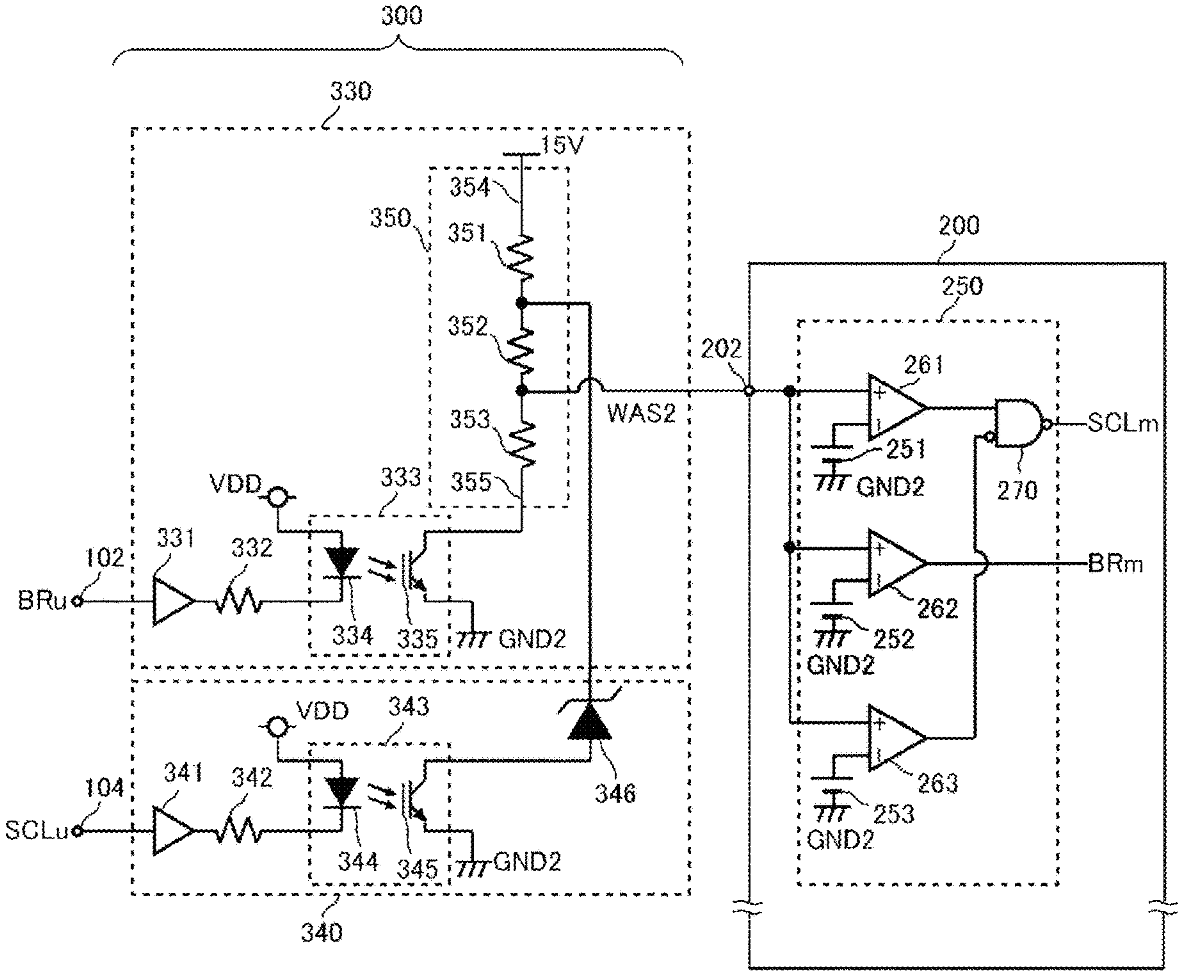
FIG. 5 illustrates another configuration example of a third transmission unit 330 and a power conversion circuit 200.

FIG. 5 illustrates another configuration example of the third transmission unit 330 and the power conversion circuit 200. The control circuit 100 of the present example can arrange the pulse of the control signal BRu and the pulse of the clock signal SCLu in a same period. The transmission apparatus 300 of the present example generates a pulse with an amplitude different from both the pulse of the control signal BRu and the pulse of the clock signal SCLu when the pulse of the control signal BRu and the pulse of the clock signal SCLu are superimposed on each other. As a result, each of the pulse of the control signal BRu alone, the pulse of the clock signal SCLu alone, and the pulse in which the control signal BRu and the clock signal SCLu are superimposed on each other can be identified. The second superimposed signal includes these pulses. The power conversion circuit 200 determines, based on the amplitude of each of the pulses of the second superimposed signal, whether each pulse is any of the pulse of the control signal BRu alone, the pulse of the clock signal SCLu alone, and the pulse in which the control signal BRu and the clock signal SCLu are superimposed on each other.

The third transmission unit 330 of the present example has an amplitude control unit 350 instead of the resistor 336. Other structures are similar to those of the example illustrated in FIG. 2. The amplitude control unit 350 is provided between the control circuit 100 and the control terminal 202, and generates a pulse with an amplitude different from both the pulse of the control signal BRu and the pulse of the clock signal SCLu during a period in which the pulse of the control signal BRu and the pulse of the clock signal SCLu are superimposed on each other.

The amplitude control unit 350 of the present example has a power supply line 354, a signal line 355, a first resistor 351, a second resistor 352, and a third resistor 353. The power supply line 354 is a line to which a predetermined high voltage (for example, 15 V) is applied. The signal line 355 is a line to which the control signal BRu is applied. The signal line 355 of the present example is connected to the collector of the light receiving element 335.

The first resistor 351, the second resistor 352, and the third resistor 353 are connected in series between the power supply line 354 and the signal line 355. The first resistor 351 is connected to the power supply line 354, and the third resistor 353 is connected to the signal line 355. The second resistor 352 is connected between the first resistor 351 and the third resistor 353.

The clock signal SCLu is applied to a connection point of the first resistor 351 and the second resistor 352. In the present example, the cathode of the Zener diode 346 is connected to the connection point. In addition, a connection point of the second resistor 352 and the third resistor 353 is connected to the control terminal 202. Resistance values of the first resistor 351, the second resistor 352, and the third resistor 353 may be identical to each other, or may be different from each other.

During a period in which the pulses of the control signal BRu and the clock signal SCLu are superimposed on each other, the light receiving element 335 and the light receiving element 345 are turned on. A voltage at the connection point of the first resistor 351 and the second resistor 352 is clamped to a breakdown voltage (5 V) of the Zener diode 346. In addition, a reference voltage GND2 (0 V) is applied to the signal line 355. Thus, the voltage of the second superimposed signal WAS2 becomes a voltage obtained by dividing 5 V by a resistance ratio of the second resistor 352 and the third resistor 353. As an example, when the resistance value of the second resistor 352 is equal to the resistance value of the third resistor 353, the voltage of the second superimposed signal WAS2 becomes 2.5 V.

The voltage of the second superimposed signal WAS2 in a case where the pulse of the control signal BRu exists alone and a case where the pulse of the clock signal SCLu exists alone may be similar to the example of FIG. 4. A voltage of each signal is set according to a resistance value or the like of each resistor. The voltage of the second superimposed signal WAS2 in a case where the pulse of the control signal BRu exists alone and a case where the pulse of the clock signal SCLu exists alone may be different from the example of FIG. 4. In the present example, the voltage (for example, 0 V) of the second superimposed signal WAS2 in a case where the pulse of the control signal BRu exists alone is lower than the voltage of the second superimposed signal WAS2 during the period in which the pulses of the control signal BRu and the clock signal SCLu are superimposed on each other. On the other hand, the voltage (for example, 5 V) of the second superimposed signal WAS2 in a case where the pulse of the clock signal SCLu exists alone is higher than the voltage of the second superimposed signal WAS2 during the period in which the pulses of the control signal BRu and the clock signal SCLu are superimposed on each other.

During a period in which the pulse of the control signal BRu exists alone, the light receiving element 335 turns on, and the light receiving element 345 turns off. The voltage at the connection point of the first resistor 351 and the second resistor 352 is not clamped by the Zener diode 346. In addition, the reference voltage GND2 (0 V) is applied to the signal line 355. Thus, the voltage of the second superimposed signal WAS2 becomes a voltage obtained by dividing 15 V by a resistance ratio of the first resistor 351, the second resistor 352, and the third resistor 353. As an example, when a sum of the resistance values of the first resistor 351 and the second resistor 352 is sufficiently larger than the resistance value of the third resistor 353, the voltage of the second superimposed signal WAS2 becomes approximately 0 V. The resistance value of the first resistor 351 may be larger than a sum of the resistance values of the second resistor 352 and the third resistor 353.

During a period in which the pulse of the clock signal SCLu exists alone, the light receiving element 335 turns off, and the light receiving element 345 turns on. The voltage at the connection point of the first resistor 351 and the second resistor 352 is clamped to 5 V by the Zener diode 346. In addition, the signal line 355 is separated from the reference voltage GND2 (0 V). Thus, the voltage of the second superimposed signal WAS2 becomes 5 V.

The power conversion circuit 200 of the present example includes a signal identification unit 250 which functions as the control identification unit 230 and the clock identification unit 240. Other structures are similar to those in the examples described in FIG. 1 to FIG. 4.

The signal identification unit 250 mutually separates and extracts the control signal BRu and the clock signal SCLu from the second superimposed signal WAS2. As described above, the second superimposed signal WAS2 has the pulse with different amplitudes in a case where the pulse of the control signal BRu exists alone, a case where the pulse of the clock signal SCLu exists alone, and a case where the pulses of the control signal BRu and the clock signal SCLu are superimposed on each other. The signal identification unit 250 determines, based on the amplitude of each of the pulses of the second superimposed signal WAS2, whether each pulse is a sole pulse of either the control signal BRu or the clock signal SCLu or a pulse in which the control signal BRu and the clock signal SCLu are superimposed on each other. The signal identification unit 250 generates the control signal BRm and the clock signal SCLm based on a determination result.

The signal identification unit 250 of the present example has a reference voltage generation unit 251, a comparator 261, a reference voltage generation unit 252, a comparator 262, a reference voltage generation unit 253, a comparator 263, and a logic circuit 270. An operation of the signal identification unit 250 will be described by using a timing chart.

Figure 6:
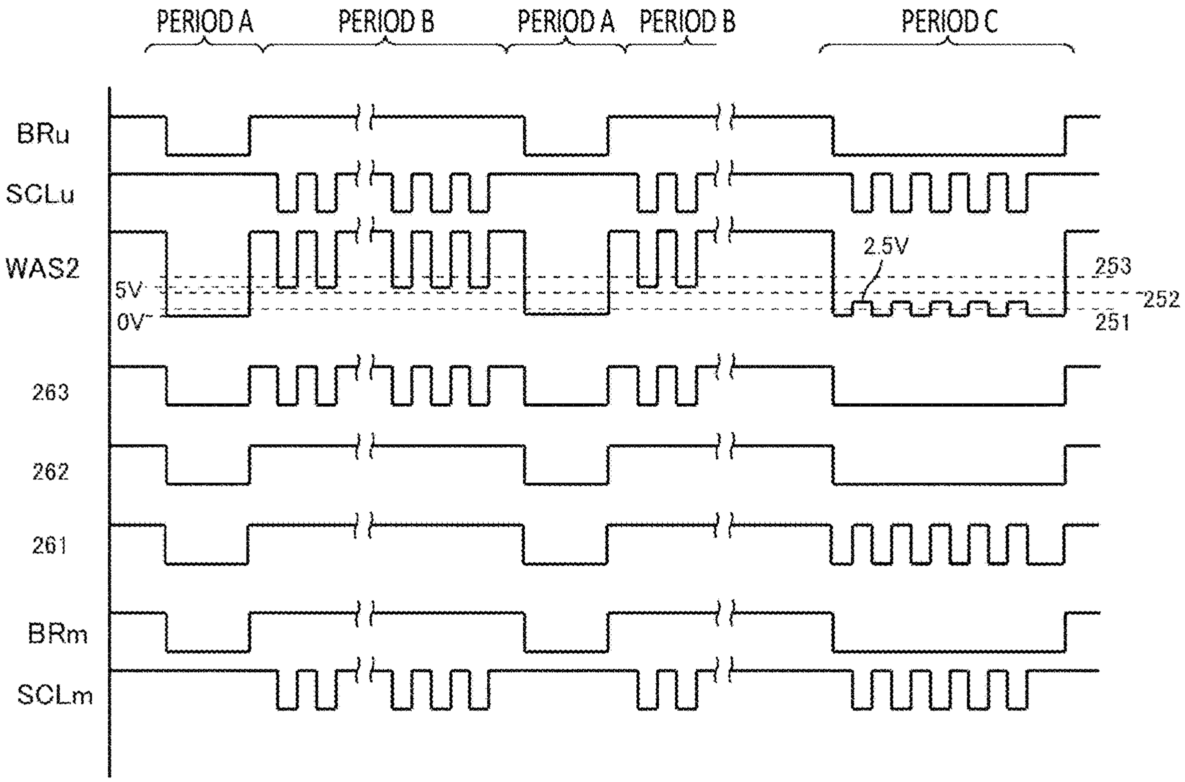
FIG. 6 is a timing chart for describing an operation related to the control circuit 100, a transmission apparatus 300, and a signal identification unit 250.

FIG. 6 is a timing chart for describing operations of the control circuit 100, the transmission apparatus 300, and the signal identification unit 250. The control circuit 100 of the present example outputs both the pulse of the control signal BRu and the pulse of the clock signal SCLu during a period C. The operations during the period A and the period B are similar to the example of FIG. 4.

When the pulse of the control signal BRu exists alone, the voltage of the second superimposed signal WAS2 becomes a first voltage (in the present example, 0 V). When the pulse of the control signal BRu and the pulse of the clock signal SCLu are superimposed on each other, the voltage of the second superimposed signal WAS2 becomes a second voltage (in the present example, 2.5 V). When the pulse of the clock signal exists alone, the voltage of the second superimposed signal WAS2 becomes a third voltage (in the present example, 5 V).

The reference voltage generation unit 251 generates a fourth reference voltage which is higher than the first voltage (0 V) and lower than the second voltage (2.5 V). The comparator 261 outputs a voltage at the L level when the voltage of the second superimposed signal WAS2 is equal to or lower than the fourth reference voltage, and outputs a voltage at the H level when the voltage of the second superimposed signal WAS2 is higher than the fourth reference voltage. As a result, the comparator 261 outputs a signal which turns to the L level during the period in which the pulse of the control signal BRu exists alone and which turns to the H level during the other periods.

The reference voltage generation unit 252 generates a fifth reference voltage which is higher than the second voltage (2.5 V) and lower than the third voltage (5 V). The comparator 262 outputs a voltage at the L level when the voltage of the second superimposed signal WAS2 is equal to or lower than the fifth reference voltage, and outputs a voltage at the H level when the voltage of the second superimposed signal WAS2 is higher than the fifth reference voltage. As a result, the comparator 262 outputs a signal which turns to the L level during the period in which the pulse of the control signal BRu exists and which turns to the H level during the other periods irrespective of the presence or absence of the pulse of the clock signal SCLu. The signal identification unit 250 of the present example sets the signal output by the comparator 262 as the control signal BRm.

The reference voltage generation unit 253 generates a sixth reference voltage which is higher than the third voltage (5 V) and lower than a predetermined high voltage (15 V). The comparator 263 outputs a voltage at the L level when the voltage of the second superimposed signal WAS2 is equal to or lower than the sixth reference voltage, and outputs a voltage at the H level when the voltage of the second superimposed signal WAS2 is higher than the sixth reference voltage. As a result, the comparator 263 outputs a signal which turns to the L level during the period in which the pulse of at least one of the control signal BRu or the clock signal SCLu exists and which turns to the H level during the other periods.

The logic circuit 270 generates the clock signal SCLm based on the signal output by the comparator 261 and the signal output by the comparator 263. The logic circuit 270 of the present example outputs a voltage at the L level during a period in which the signal output by the comparator 261 indicates the H level and also the signal output by the comparator 263 indicates the L level. During the other periods, the logic circuit 270 outputs the voltage at the H level. The signal identification unit 250 of the present example sets the signal output by the logic circuit 270 as the clock signal SCLm. The logic circuit 270 may invert and output a logical AND of an inverted signal of the output of the comparator 263 and the output of the comparator 261.

According to the present example, the control signal BRu and the clock signal SCLu can be simultaneously transferred by using the single control terminal 202. Thus, while the number of terminals in the power conversion circuit 200 is suppressed, a degree of freedom in the signal patterns of the control signal BRu and the clock signal SCLu can be improved.

While the present invention has been described with the embodiments, the technical scope of the present invention is not limited to the above embodiments. It is apparent to persons skilled in the art that various alterations and improvements can be added to the above-described embodiments. It is also apparent from description of the claims that the embodiments to which such alterations or improvements are made can be included in the technical scope of the present invention.

What is claimed is:

1. A circuit apparatus comprising a power conversion circuit, and a control circuit which controls the power conversion circuit, wherein the power conversion circuit includes:

a control terminal to which a control signal from the control circuit is input;

an output terminal from which an output signal is output to the control circuit; and a data identification unit which identifies an input data signal from the control circuit input to the power conversion circuit through the output terminal.

2. The circuit apparatus according to claim 1, wherein a first superimposed signal in which the output signal and the input data signal are superimposed on each other is input to the data identification unit, and the data identification unit identifies the input data signal based on the first superimposed signal and the output signal.

3. The circuit apparatus according to claim 2, wherein the data identification unit extracts a pulse other than a pulse of the output signal among pulses included in the first superimposed signal to generate the input data signal.

4. The circuit apparatus according to claim 1, wherein the output signal includes an alarm signal indicating whether the power conversion circuit is put into a preset state.

5. The circuit apparatus according to claim 1, wherein the output signal includes an output data signal output by the power conversion circuit.

6. The circuit apparatus according to claim 2, further comprising:

a first transmission unit which is provided between the output terminal and the control circuit and outputs a signal from the output terminal to the control circuit; and a second transmission unit which superimposes the input data signal from the control circuit on the signal at the output terminal, wherein the data identification unit receives the signal at the output terminal.

7. The circuit apparatus according to claim 2, wherein the control circuit receives the first superimposed signal, and identifies the output signal based on the first superimposed signal and the input data signal.

8. The circuit apparatus according to claim 6, wherein the first transmission unit transmits a signal with a reference current value or above among signals at the output terminal to the control circuit, and the second transmission unit converts the input data signal into a signal with a current less than the reference current value to be superimposed on the signal at the output terminal.

9. The circuit apparatus according to claim 1, wherein the power conversion circuit further includes a clock identification unit which separates a clock signal input to the control terminal from the control signal.

10. The circuit apparatus according to claim 9, wherein a second superimposed signal in which the control signal and the clock signal with an amplitude different from the control signal are superimposed on each other is input to the control terminal, and the clock identification unit separates the control signal from the clock signal based on an amplitude of each pulse included in the second superimposed signal.

11. The circuit apparatus according to claim 10, further comprising:

a third transmission unit which is provided between the control circuit and the control terminal and transmits the control signal to the control terminal; and a fourth transmission unit which is provided between the control circuit and the control terminal and transmits the clock signal to the control terminal to generate the second superimposed signal, wherein at least one of the third transmission unit or the fourth transmission unit includes an amplitude conversion unit which converts an amplitude of a signal.

12. The circuit apparatus according to claim 10, wherein the control circuit arranges a pulse of the control signal and a pulse of the clock signal in different periods.

13. The circuit apparatus according to claim 10, wherein the control circuit is capable of arranging a pulse of the control signal and a pulse of the clock signal in a same period.

14. The circuit apparatus according to claim 13, further comprising:

an amplitude control unit which is provided between the control circuit and the control terminal and generates a pulse having an amplitude different from both the pulse of the control signal and the pulse of the clock signal during a period in which the pulse of the control signal and the pulse of the clock signal are superimposed on each other.

15. The circuit apparatus according to claim 14, wherein the amplitude control unit includes:

a power supply line;

a signal line to which the control signal is applied; and a first resistor, a second resistor, and a third resistor which are connected in series between the power supply line and the signal line, wherein the clock signal is applied to a connection point of the first resistor and the second resistor, and a connection point of the second resistor and the third resistor is connected to the control terminal.

16. A power conversion circuit which is controlled by a control circuit, the power conversion circuit comprising:

a control terminal to which a control signal from the control circuit is input;

an output terminal from which an output signal is output to the control circuit; and a data identification unit which identifies an input data signal from the control circuit input to the power conversion circuit through the output terminal.

17. The power conversion circuit according to claim 16, wherein a first superimposed signal in which the output signal and the input data signal are superimposed on each other is input to the data identification unit, and the data identification unit identifies the input data signal based on the first superimposed signal and the output signal.

18. The power conversion circuit according to claim 17, wherein the data identification unit extracts a pulse other than a pulse of the output signal among pulses included in the first superimposed signal to generate the input data signal.

19. The power conversion circuit according to claim 16, wherein the output signal includes an alarm signal indicating whether the power conversion circuit is put into a preset state.

20. The power conversion circuit according to claim 16, wherein the output signal includes an output data signal output by the power conversion circuit.

21. The power conversion circuit according to claim 16, further comprising:

a clock identification unit which separates a clock signal input to the control terminal from the control signal.

22. The power conversion circuit according to claim 21, wherein a second superimposed signal in which the control signal and the clock signal with an amplitude different from the control signal are superimposed on each other is input to the control terminal, and the clock identification unit separates the control signal from the clock signal based on an amplitude of each pulse included in the second superimposed signal.

* * * * *